(12) United States Patent
Lederer et al.

(10) Patent No.: US 11,700,231 B2
(45) Date of Patent: Jul. 11, 2023

(54) METHOD FOR ASSIGNING A MAC ADDRESS, AND DATABASE WITH MAC ADDRESSES

(71) Applicant: Unify Patente GmbH & Co. KG, Munich (DE)

(72) Inventors: Thomas Lederer, Herrsching (DE); Johann Zeiner, Karlsfield (DE)

(73) Assignee: Unify Patente GmbH & Co. KG, Munich (DE)

( * ) Notice: Subject to any disclaimer, the term of this patent is extended or adjusted under 35 U.S.C. 154(b) by 875 days.

(21) Appl. No.: 16/328,450

(22) PCT Filed: Aug. 28, 2017

(86) PCT No.: PCT/EP2017/071581
§ 371 (c)(1),
(2) Date: Feb. 26, 2019

(87) PCT Pub. No.: WO2018/041795
PCT Pub. Date: Mar. 8, 2018

(65) Prior Publication Data
US 2021/0203634 A1    Jul. 1, 2021

(30) Foreign Application Priority Data

Aug. 29, 2016    (DE) .......................... 102016116077.6

(51) Int. Cl.
*H04L 61/5061* (2022.01)
*H04L 61/5038* (2022.01)
(Continued)

(52) U.S. Cl.
CPC ...... *H04L 61/5038* (2022.05); *H04L 61/5061* (2022.05); *H04L 61/5084* (2022.05); *H04L 2101/622* (2022.05)

(58) Field of Classification Search
CPC ............. H04L 61/6022; H04L 61/6018; H04L 61/2038; H04L 61/20; H04L 41/0803;
(Continued)

(56) References Cited

U.S. PATENT DOCUMENTS 6,363,423 B1    3/2002 Chiles et al.
8,009,626 B2 *  8/2011 Anjum ................ H04L 61/2038
                                                              370/331
(Continued)

FOREIGN PATENT DOCUMENTS

DE    602004005632 T2    1/2008
EP         1511235 A1    3/2005
(Continued)

OTHER PUBLICATIONS

International Preliminary Reporton Patentability for PCT/US2017/071581 dated Mar. 5, 2019 (English).
(Continued)

*Primary Examiner* — Kamal B Divecha
*Assistant Examiner* — Vinh Nguyen
(74) *Attorney, Agent, or Firm* — Buchanan Ingersoll & Rooney PC

(57) ABSTRACT

A method in which a communication device can be configured with a MAC address so that when the user logs into a network environment using a communication device from among a number of communication devices a MAC address is assigned to the user and is specific to the user. The MAC address assignment can be used for pairing with a communication device assigned to the user (e.g. a near-field communication device). A database containing MAC addresses can be connected to communication devices through a network and can provide user-specific MAC addresses that are readable into or otherwise transmittable to a predetermined communication device when a user logs into the (Continued)

network. The database can be managed by a server or other computer device of the network.

20 Claims, 1 Drawing Sheet

(51) Int. Cl.
*H04L 61/5084* (2022.01)
*H04L 101/622* (2022.01)

(58) Field of Classification Search
CPC ............ H04L 61/2061; H04L 61/2084; H04L 61/605; H04L 45/7453; G06F 12/1018; G06F 16/137; G07B 2017/00782; G11B 20/00898
See application file for complete search history.

(56) References Cited

U.S. PATENT DOCUMENTS

| | | | | |
|---|---|---|---|---|
| 8,364,963 | B2* | 1/2013 | Lind | H04M 1/6066 |
| | | | | 713/171 |
| 10,180,962 | B1* | 1/2019 | Kapoor | H04M 15/8228 |
| 2002/0131445 | A1* | 9/2002 | Skubic | H04L 61/2053 |
| | | | | 370/465 |
| 2004/0141468 | A1 | 7/2004 | Christensen et al. | |
| 2004/0264664 | A1 | 12/2004 | Idoni et al. | |
| 2004/0264665 | A1* | 12/2004 | Idoni | H04M 7/009 |
| | | | | 379/201.01 |
| 2005/0048919 | A1* | 3/2005 | Jeannerod | H04W 8/26 |
| | | | | 455/41.2 |
| 2007/0123166 | A1* | 5/2007 | Sheynman | H04M 1/72412 |
| | | | | 455/41.2 |
| 2007/0211651 | A1 | 9/2007 | Ahmed et al. | |
| 2007/0211653 | A1 | 9/2007 | Mizukoshi | |
| 2008/0102793 | A1* | 5/2008 | Ananthanarayanan | |
| | | | | H04W 12/06 |
| | | | | 455/411 |
| 2009/0049199 | A1* | 2/2009 | Kuik | H04L 29/12839 |
| | | | | 709/245 |
| 2009/0081999 | A1* | 3/2009 | Khasawneh | H04M 3/56 |
| | | | | 455/416 |
| 2011/0250842 | A1 | 10/2011 | Stafford et al. | |
| 2012/0167176 | A1* | 6/2012 | Hwang | H04W 12/50 |
| | | | | 726/3 |
| 2013/0199420 | A1 | 8/2013 | Hjelm | |
| 2016/0073218 | A1* | 3/2016 | Shui | H04W 76/10 |
| | | | | 455/41.2 |
| 2016/0337496 | A1* | 11/2016 | Jeganathan | H04M 1/72412 |
| 2017/0094511 | A1* | 3/2017 | Na | H04W 12/06 |
| 2017/0331642 | A1* | 11/2017 | Lyotier | H04W 4/12 |
| 2018/0014145 | A1* | 1/2018 | Seaman | H04W 4/023 |
| 2018/0103338 | A1* | 4/2018 | Lu | H04W 84/18 |

FOREIGN PATENT DOCUMENTS

| | | |
|---|---|---|
| EP | 3151144 A1 | 4/2017 |
| WO | 2015181429 A1 | 12/2015 |

OTHER PUBLICATIONS

International Search Report for PCT/US2017/071581 dated Nov. 14, 2017 (German).
Written Opinion of the International Searching Authority for PCT/US2017/071581 dated Nov. 14, 2017 (German).
International Search Report for PCT/US2017/071581 dated Nov. 14, 2017 (English Translation).

* cited by examiner

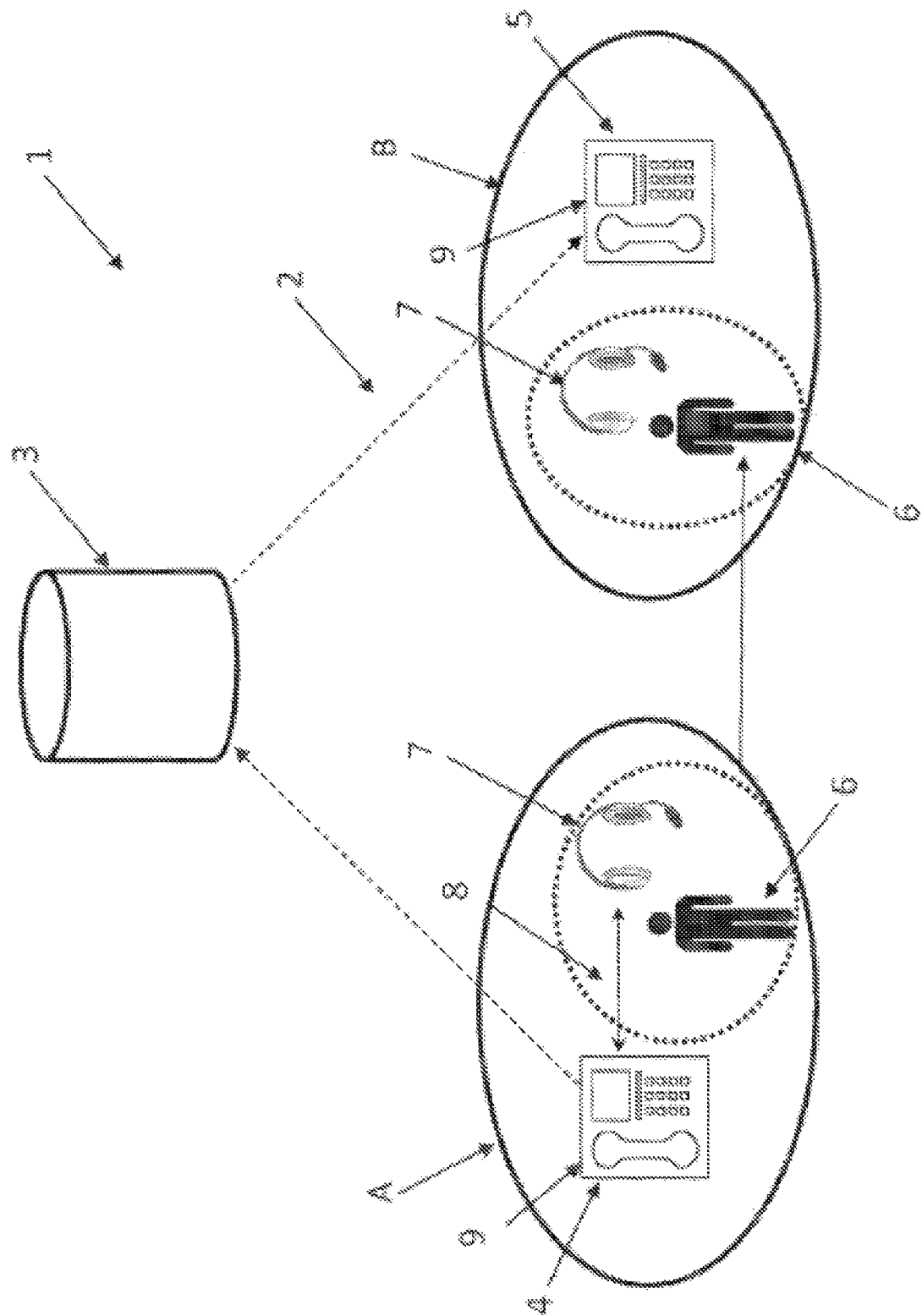

METHOD FOR ASSIGNING A MAC ADDRESS, AND DATABASE WITH MAC ADDRESSES

CROSS-REFERENCE TO RELATED APPLICATIONS

The present application is the U.S. national stage filing of International Patent Application No. PCT/EP2017/071581, which claims priority to German Patent Application 10 2016 116 077.6, filed on Aug. 29, 2016.

FIELD

The invention concerns a method for assigning a media access control ("MAC") address to a communication device in a network environment as well as a database with MAC addresses, a communication apparatus, a communication system, and a communication device.

BACKGROUND

As part of the efficient use of available work space, the concept of desk-sharing environments or "flexible offices" has been developed; it describes a way to organize a company in which employees in an organizational unit (e.g. company, division, department) can freely choose their work location each day, for more balanced use of the work spaces in the office building. By applying this concept, employers can not only optimize their employees' workspace needs but also save on other expenses, such as office equipment costs, cleaning costs, energy costs, etc. In order to further optimize the efficiency resulting from this type of concept, employees need to have as much information and data stored electronically as possible, so that the daily change from desk to desk does not involve any great effort. However, for a smooth transfer from one work space to the next, not only data availability but also telephone access to the employee at any work space plays a role. It is especially important for the user of the flexible work space to be able to switch seamlessly from one work space to another with his telephone number or with the terminal assigned to that telephone number.

For example, in a desk-sharing environment with multiple telephones, it should be possible for a user to sign on to any telephone under the same telephone number, preferably his own. This means that he takes his own number, or the one assigned to him—just like a personal keypad code, etc.—from phone to phone in the desk-sharing environment. After signing on to a particular phone, the user's phone number then works for both incoming and outgoing calls.

SUMMARY

The problem we have recognized with use of telephones in a desk-sharing environment is that for a change of desk or of the telephone connected to the desk, in particular with respect to the use of Bluetooth headsets for the user moving from desk to desk on a daily basis, the connection for the Bluetooth headset must be made through a generally known pairing process. In this process, the respective MAC addresses of the two devices involved in the Bluetooth connection are reciprocally configured, queried, and stored. If it is then desired, for example, to use the Bluetooth headset in the desk-sharing environment or, e.g., for teleworking on another desk telephone, then the time-consuming pairing process must be repeated. In such environments, therefore, for each change of desk or work space it is necessary to perform a new pairing of the user's headset, because headsets only support a limited number of partner devices, e.g., only two or three, due to their limited operating capacity.

We have determined that there is a problem resulting from this situation. After the first time a user logs into the network environment, e.g., at a first desk telephone, then for a subsequent log-in at another desk telephone a new pairing with the user's headset is required, which is time-consuming. Pairing involves the two devices to be paired exchanging and storing each other's MAC addresses. If each device finds the other device's MAC numbers in its memory, then pairing takes place before the new log-in. However, the storage space of certain mobile devices, such as headsets, is very limited. It is therefore not possible to store very many different MAC numbers.

We have determined, for this reason, that it would be desirable for the pairing status of a user's terminal device that is already paired in the network environment to move virtually with the user inside of the network environment.

Therefore an object of the present invention is to provide a method for assigning a MAC address to a communication device in a network environment, as well as a corresponding database containing MAC addresses, which together allow a user to use a headset that is already paired with a telephony terminal device in the network environment, without repeated pairing with additional telephony terminal devices. This object is achieved by means of a method for assigning a MAC address to a communication device in a network environment and by means of a corresponding database, which may be incorporated into a network environment via a network device (e.g. a computer device hosting the database via non-transitory memory of the device and the device's processing unit).

Embodiments of the invention can provide a method for assigning a MAC address to a communication device in a network environment, which connects a number of communication devices, in particular a number of telephony terminal devices and at least one near-field communication device, to each other, wherein the communication device can be configured with a MAC address, so that when the user logs into the network environment using a communication device from among the number of communication devices, in particular using a telephony terminal device, a MAC address assigned to the user and specific to the user is used for pairing with a communication device assigned to the user, in particular a near-field communication device. The solution according to the invention uses unique Bluetooth MAC addresses that are assigned to the user and not to the device. The address can be established when the user logs in. Embodiments of the method can make it possible for a user who is using a near-field communication device, such as a Bluetooth headset, to use different communication devices in a desk-sharing environment, so that when the user logs onto a new communication device with a headset that was already paired when he first logged into the desk-sharing environment, he does not have to pair that headset again with the new communication device. The system also prevents the user from logging in a second time. Due to the user-specific generation of Bluetooth MAC addresses, it is no longer necessary to pair the headset again, because the partnership already existing in the headset can be re-used.

According to one preferred embodiment, the network environment is part of a desk-sharing environment that contains a number of communication devices, in particular at least one first telephony terminal device and one second telephony terminal device, and at least the near-field communication device, in particular a Bluetooth headset. It should be appreciated that each of these types of devices includes hardware, such as at least one processor connected to a non-transitory computer readable medium (e.g. flash memory or other type of non-transitory memory). Such devices can also include at least one transceiver (e.g at least one receiver and at least one transmitter). The telephony devices can also include other elements, such as a speaker, a micropone, and/or a display. A Bluetooth headset can include at least one speaker and may also include at least one microphone. A Bluetooth headset can also include a frame that permits the headset to be worn by a user.

Preferably the MAC address assigned to and specific to the user for pairing the communication device, in particular the telephony terminal device, with the user's near-field communication device, e.g. the Bluetooth headset, is configured in the communication device, so that when the user first logs into a first environment of the network environment, pairing between a first communication device and the user's near-field communication device is performed in the first environment.

In addition, it is advantageous if, when the user logs into a second environment of the network environment after the first log-in, a second communication device uses the MAC address assigned to and specific to the user. This makes a new pairing between the second communication device and the user's near-field communication device unnecessary.

According to another preferred embodiment, the user logs into the network environment through the communication device. In addition, when the user logs into the network environment, a telephone number assigned to the user can be assigned to the communication device.

The MAC address assigned to and specific to the user can be advantageously generated from a unique identifier belonging to the user, which is permanently assigned to the user from a central pool of addresses when logging into the first environment, and wherein the unique identifier assigned to the user from the central pool of addresses is stored in a user profile.

It can also be advantageous if the unique identifier assigned to the user, which is used to generate the MAC address on the first telephony terminal device in the first environment, is generated by calculating a hash value, in particular with 24 or fewer bits, from the user's telephone number.

This can effectively prevent double assignment of the MAC address in the local environment, which can have a radius of 10-100 m depending on the Bluetooth class. It is only necessary to ensure that, for the log-in process on the respective telephony terminal device, all devices then use the user-specific MAC address assigned to the user (either assigned and stored in the user profile or using the established hash algorithm).

The unique identifier assigned to the user can be stored in a central database on the network, in particular in a communication device configuration database, which advantageously serves the mobility of users in the network environment.

The unique identifier assigned to the user is preferably written or read to an individually configurable part of the MAC address, e.g. to a second half of the MAC address consisting of 3 bytes or some other pre-selected number of bytes. A MAC address consists of 48 bits. The first 3 bytes are set by the manufacturer to contain its identifier. In the second half, which also consists of 3 bytes, values defined individually according to the manufacturer's standard can be used. Values taken from the unique serial number of a device are normally used for this individual portion of the MAC address. According to this embodiment, however, a unique identifier assigned to the user can be written to the individual half of the MAC address, in order to generate a user-specific MAC address.

In addition, a database containing MAC addresses is provided. For example, a communication device configuration database can be connected to communication devices through a network and can provide MAC addresses so that they are read into a predetermined communication device when a user logs into the network. The database can be hosted by a server or other type of computer device that includes hardware. The hardware can include at least one processor connected to non-transitory computer readable medium (e.g. non-transitory memory). The hardware can also include at least one network interface device (e.g. a network card, a transceiver, etc.) for connecting the computer device to the network and facilitating the transmission and receipt of data via the network. A communication apparatus and communication system are also provided. The communication apparatus and communication system can be configured to utilize an embodiment of the method.

Additional features, tasks, advantages and details of the present invention will become more apparent from the following description of specific exemplary embodiments and their representation in drawings in the included figures. It is understood that features, tasks, advantages and details of individual exemplary embodiments are transferable to other exemplary embodiments and are considered to be disclosed also in connection with the other exemplary embodiments unless this is obviously inapplicable for technical or physical reasons. Accordingly, features of various exemplary embodiments can fundamentally be combined with other exemplary embodiments and the combination can also be considered an exemplary embodiment of the invention.

BRIEF DESCRIPTION OF THE DRAWINGS

The invention is described below in more detail based on preferred exemplary embodiments and with reference to the FIGURE. In this regard, the FIGURES include:

FIG. 1 is a schematic representation of an exemplary network environment according to one exemplary embodiment of the invention.

A key of references listed in FIG. 1 is provided below:
1 Network environment
2 Network
3 Database (e.g. a communication device configuration database);
4 First communication device;
5 Second communication device;
6 User;
7 Near-field communication device or headset;
8 Bluetooth connection;
9 Bluetooth MAC address;
A First environment with first work space; and
B Second environment with second work space.

DETAILED DESCRIPTION OF EXEMPLARY EMBODIMENTS

As can be appreciated from FIG. 1 a network environment 1 can include a network 2, through which a central database 3 is connected to a first communication device 4 and a second communication device 5. The central database 3 is configured as a communication device configuration database, and the first communication device 4 as well as the second communication device 5 are each telephony terminal devices in the form of desktop telephones, which are available to a user 6 of the network environment 1. The user 6 has a near-field communication device 7, in the form of a headset, for example, which is configured so that it can connect through a Bluetooth connection 8 with a respective telephone terminal device or first communication device 4 and/or second communication device 5. Each telephone terminal device is a machine and includes hardware (e.g. a processor connected to non-transitory memory and at least one transceiver). The near field communication device can include a near field wireless connection transceiver, a processor and a non-transitory computer readable medium. Each of these devices can also include input devices, output devices and/or at least one input/output ("I/O") device such as a microphone and a speaker. The telephony devices or communication devices can also include other types of input or output devices (e.g. a display, a pointer device, a keyboard, a touch screen display, etc.).

The general concept of the network environment 1 shown, which offers the user a so-called "User Mobility" feature, is described below. The network environment 1 shown is implemented as a desk-sharing environment, which contains a number of fully equipped work spaces. This means, for example, that a first work space can be available in a first environment A and a second work space in a second environment B. Additional identical or at least similarly equipped work spaces can be available in other environments, although they are not shown here. However, the network environment 1 or desk-sharing environment can contain any number of work spaces, e.g., with identical equipment or similar equipment, or with equipment for special purposes. Each work space for this purpose has an available communication device, such as the first communication device 4 or telephony terminal device in the first environment A and the second communication device 5 or telephony terminal device in the second environment B. The desk-sharing environment is used by a user 6, who is an employee of a company, for example, in such a way that at the beginning of his work shift he selects or is assigned to a certain work space. In order to use the communication device available at this work space, for example the first communication device 4 in the form of a telephony terminal device or desktop telephone, the user 6 must log in using his telephone number or one assigned to him. The user 6 then takes this telephone number with him if, for example, he logs in on the next workday at another work space, for example on the second communication device 5 in the second environment B. This means that the user 6 is always able to make and receive calls under the telephone number assigned to him, once he has signed on or logged in at the current work space. The telephone number assigned to the user 6 therefore moves, so to speak, from work space to work space with the user 6, as does a personal keypad code and similar things that he needs, for example, in order to sign on or log in to any work space.

In known desk-sharing environments according to the prior art, as already stated, with each change of work space, i.e., with each sign-on or log-in to a communication device assigned to the work space, for example, a Bluetooth headset 7 used by the user 6 with the respective communication device, for example with the first communication device 4, must be paired through the Bluetooth connection 8 if the work space of the user 6 is in the first environment A (pairing). Normally, to do this, the MAC addresses of the devices involved in the pairing process are exchanged through the Bluetooth connection 8 and the respective other MAC addresses are stored. Therefore, with respect to the example shown here, for example, in the first environment A the MAC address of the first communication device 4 and the MAC address of the Bluetooth headset 7 were exchanged through the Bluetooth connection 8, and the MAC address of the Bluetooth headset 7 was stored in the communication device 4 and the MAC address of the communication device 4 was stored in the Bluetooth headset 7. If the user 6 switched, for example, to the environment B, this pairing process would then have to take place again between the Bluetooth headset 7 and the second communication device 5, because headsets support only a limited number of configured partner devices, for example two, due to their limited operating capacity.

However, repeated pairing when changing between work spaces can be prevented by means of the configuration that can be provided by an embodiment of the invention. Today's Bluetooth chipsets allow configuration of the Bluetooth MAC address, through a software function, for example. According to one embodiment of the present invention, with the use of such a Bluetooth chipset, a MAC address can be generated or configured that is assigned to the user and specific to the user. Such a unique user-specific MAC address is configurable from the telephone number of the user 6, for example. Then this user-specific part, which consists of the telephone number of the user 6 as stated above, for example, is written into the second half of the MAC address, which can consist of 3 bytes representing the individually configurable portion of the MAC address, for example. For this individually configurable part of the MAC address, the first half of the MAC address, which can also consist of 3 bytes, is set to the manufacturer's identifier and cannot be configured. To avoid double assignment of the MAC address in the network environment 1, a hash value of 24 or fewer bits can also be calculated from the telephone number of the user 6, which then makes it highly unlikely that a conflict would occur for a possible value quantity of $2^{24}$. Alternatively, a one-time entry of a MAC address can be made from a central pool of MAC addresses configured by an administrator, wherein a permanent assignment of the MAC address occurs after a first log-in process by the user 6. By generating user-specific MAC addresses as described above, a unique MAC address exists that is assigned to the user 6 and not to the device, which is configured or generated on the first communication device 4 when the user 6 first logs into the network environment 1, e.g., in the first environment A. This user-specific MAC address (which can be either assigned and stored in the user profile or generated using the established hash algorithm, as described above) is then used when logging in to all other communication devices, such as the second communication device 5, so that a new pairing between the second communication device 5 and the headset 7 is not necessary.

The following describes one exemplary embodiment of the method for assigning a MAC address to a communication device 4, 5 in a network environment 1. The user 6, who is using the headset 7, logs in for the first time on the first communication device 4 in the first environment A in the network environment 1. During this process, the first communication device 4 and the headset 7 of the user 6 are paired, wherein the Bluetooth MAC address 9 is either used from a pool, as described above, or calculated from a user ID. This user-specific Bluetooth MAC address 9 can then be stored in the central database 3, for example. When the user 6 changes work spaces and therefore must log in to another work space, here to the second communication device 4 in the second environment B, then the same Bluetooth MAC address 9 from the database 3 is used, or alternatively calculated again from the user ID with the same hash algorithm. A new pairing between the headset 7 of the user 6 and the second communication device 5 is not necessary.

While certain exemplary embodiments of a communication apparatus, communication device, and methods of making and using the same have been shown and described above, it is to be distinctly understood that the invention is not limited thereto but may be otherwise variously embodied and practiced within the scope of the following claims.

The invention claimed is:

1. A method for assigning a media access control ("MAC") address in a network environment, the network environment including a plurality of communication devices and at least one near-field communication device, the method comprising:
   logging a user into the network environment via a first communication device; and
   pairing the first communication device with a first near-field communication device such that a user-specific MAC address is assigned to the user for the pairing of the first near field communication device and the first communication device, the user-specific MAC address being generated by a process comprising calculating a hash value via a defined hash algorithm from a telephone number assigned to the user to form a unique identifier for the user-specific MAC address, the user-specific MAC address including the unique identifier;
   the pairing of the first communication device and the first near-filed communication device performed such that the generated user-specific MAC address is utilizable to avoid a repeated pairing so the first near field communication device is utilizable with a second communication device after the user logs in to the second communication device without undergoing another pairing.

2. The method of claim 1, wherein the near-field communication device is a Bluetooth headset and the first communication device is a telephony device.

3. The method of claim 1, wherein the network environment is part of a desk-sharing environment.

4. The method of claim 3, wherein the user-specific MAC address assigned to the user for pairing the first communication device with the first near-field communication device is configured via the first communication device so that when the user first logs into a first environment of the network environment, the pairing between the first communication device and the first near-field communication device is performed in the first environment.

5. The method of claim 4, comprising:
   logging the user into a second environment of the network environment after the user was logged into the first environment of the network environment so that the second communication device uses the user-specific MAC address assigned to the user for connecting with the first near-field communication device.

6. The method of claim 1, wherein the logging in of the user is performed such that the telephone number assigned to the user is assigned to the first communication device.

7. The method of claim 1, comprising:
   generating the user-specific MAC address from the unique identifier, the unique identifier assigned to the user, the unique identifier assigned to the user being stored in a central pool of addresses.

8. The method of claim 7, comprising:
   storing the unique identifier assigned to the user in a user profile of the user.

9. The method of claim 7, wherein the hash value has a pre-selected number of bits.

10. The method of claim 9, wherein the unique identifier is 24 bits or less than 24 bits.

11. The method of claim 7, wherein the unique identifier is stored in a central database of a network of the network environment.

12. The method of claim 7, comprising:
    writing the unique identifier to an individually configurable part of a MAC address of the first near field communication device.

13. The method of claim 12, wherein the configurable part of the MAC address of the first near field communication device is a second half of the MAC address that comprises a pre-selected number of bytes.

14. The method of claim 13, wherein the pre-selected number of bytes is 3 bytes.

15. A communication apparatus comprising:
    a computer device that hosts a database containing MAC addresses; the computer device configured to communicatively connect the database to a plurality of communication devices via a network to provide user-specific MAC addresses to the communication devices so that each of the user-specific MAC addresses are readable into a first communication device of the plurality of communication devices when a user of the user-specific MAC address logs into the network via the first communication device, each of the user-specific MAC addresses within the database comprising a hash value calculated via a defined hash algorithm from a telephone number assigned to a respective user to form a unique identifier for the user-specific MAC address of the user, the user-specific MAC address including the unique identifier so that pairing of the first communication device with a first near-filed communication device is performable such that the generated user-specific MAC address is utilizable to avoid a repeated pairing so the first near field communication device is utilizable with other communication devices of the plurality of communication devices after the user logs in to the other communication devices without undergoing another pairing.

16. The communication apparatus of claim 15, wherein the first near field communication device is a headset or a Bluetooth headset.

17. The communication apparatus of claim 15, wherein the first communication device is a telephony device.

18. The communication apparatus of claim 15, wherein the hash value has a pre-selected number of bits.

19. The communication apparatus of claim 18, wherein the unique identifier is 24 bits or less than 24 bits.

20. The communication apparatus of claim 15, wherein the unique identifier is the hash value.

* * * * *